United States Patent
Saito et al.

(10) Patent No.: US 10,444,113 B2
(45) Date of Patent: Oct. 15, 2019

(54) METHOD OF MEASURING CROSSTALK OF MULTICORE FIBER AND APPARATUS OF MEASURING THE SAME

(71) Applicant: FUJIKURA LTD., Tokyo (JP)

(72) Inventors: Shota Saito, Sakura (JP); Katsuhiro Takenaga, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/755,345

(22) PCT Filed: Jan. 26, 2017

(86) PCT No.: PCT/JP2017/002709
§ 371 (c)(1),
(2) Date: Feb. 26, 2018

(87) PCT Pub. No.: WO2017/145629
PCT Pub. Date: Aug. 31, 2017

(65) Prior Publication Data
US 2018/0246007 A1    Aug. 30, 2018

(30) Foreign Application Priority Data

Feb. 26, 2016 (JP) .................................. 2016-036091
Jun. 10, 2016 (JP) .................................. 2016-116589

(51) Int. Cl.
*G01M 11/00* (2006.01)
*G02B 6/02* (2006.01)
(Continued)

(52) U.S. Cl.
CPC ........ *G01M 11/33* (2013.01); *G01M 11/0207* (2013.01); *G02B 6/02042* (2013.01); *H04B 3/487* (2015.01)

(58) Field of Classification Search
CPC . G02B 6/02042; G01M 11/33; H04B 10/0795
See application file for complete search history.

(56) References Cited

U.S. PATENT DOCUMENTS 8,923,668 B2 *  12/2014  Hayashi ............... G01M 11/088
                                                              385/31
10,203,265 B2 *  2/2019  Hayashi ................. G01M 11/35
(Continued)

FOREIGN PATENT DOCUMENTS

CN       102706535 A      10/2012
CN       103392120 A      11/2013
(Continued)

OTHER PUBLICATIONS

K. Imamura et al., "Multi-core holey fibers for the long-distance (>100 km) ultra large capacity transmission," OFC/NFOEC2009, OTuC3 (2009).
(Continued)

*Primary Examiner* — Shawn Decenzo
(74) *Attorney, Agent, or Firm* — Osha Liang LLP

(57) ABSTRACT

A method of measuring crosstalk of a multicore fiber, the method including capturing an emitted light pattern at an end portion of a dummy fiber and obtaining a correlation data between a power of the light incident on the dummy fiber and the emitted light pattern, irradiating one core of the multicore fiber with a light through the dummy fiber, and measuring a power of a reference light emitted from the core, capturing a crosstalk light emitted from a different core different from the core on which the light is incident under a state where the reference light is masked, and estimating a power of the crosstalk light from a captured data of the crosstalk light and the correlation data, and calculating the crosstalk from the power of the reference light and the power of the crosstalk light.

7 Claims, 8 Drawing Sheets

(51) Int. Cl.
*H04B 3/487* (2015.01)
*G01M 11/02* (2006.01)

(56) References Cited

U.S. PATENT DOCUMENTS

| | | | |
|---|---|---|---|
| 2012/0224808 A1 | 9/2012 | Hayashi et al. | |
| 2012/0250008 A1 | 10/2012 | Hayashi | |
| 2014/0003807 A1* | 1/2014 | Hamaguchi | H04B 10/0795 398/29 |
| 2018/0038769 A1* | 2/2018 | Hayashi | G01M 11/31 |
| 2018/0246007 A1* | 8/2018 | Saito | G01M 11/33 |

FOREIGN PATENT DOCUMENTS

| | | |
|---|---|---|
| JP | S60-67833 A | 4/1985 |
| JP | 2012-202827 A | 10/2012 |
| JP | 2013-130558 A | 7/2013 |
| JP | 5588050 B2 | 9/2014 |
| JP | 2015-225028 A | 12/2015 |
| JP | 2015-230263 A | 12/2015 |
| JP | 2016-085120 A | 5/2016 |

OTHER PUBLICATIONS

K. Nakajima et al., "Simple crosstalk characterization technique without multiple core access," ECOC2013, Mo.4.A.5 (2013).

Y. Amma et al., "High-density multicore fiber with heterogeneous core arrangement," OFC/NFOEC2015, Th4C.4 (2015).

F. Oshiyama et al., "Central-obscuration removal plates for focal-plane phase-mask coronagraphs with a centrally-obscured telescope," Publications of the Astronomical Society of the Pacific, 126, pp. 270-279 (2014).

T. Hayashi et al., "Characterization of crosstalk in ultra-low-crosstalk multi-core fiber," IEEE/OSA Journal of Lightwave Technology, 30, pp. 583-589 (2012).

W. Ming-yan et al., "Research on Mode-coupled and Crosstalk Characteristic of Hole-Assisted Six-core Fiber," Electro-Optic Technology Application, vol. 29, Issue 6, pp. 23-28, Dec. 31, 2014 (6 pages).

Office Action issued in Chinese Patent Application No. 2017800021061; dated Jan. 28, 2019 (12 pages).

* cited by examiner

METHOD OF MEASURING CROSSTALK OF MULTICORE FIBER AND APPARATUS OF MEASURING THE SAME

TECHNICAL FIELD

The present invention relates to a method of measuring crosstalk of a multicore fiber and an apparatus of measuring the same.

The present application claims priority based on Japanese Patent Application No. 2016-036091 filed on Feb. 26, 2016 and Japanese Patent Application No. 2016-116589 filed on Jun. 10, 2016, the contents of which are incorporated herein by reference.

BACKGROUND ART

In order to handle increasing communication traffic in recent years, a further increase in communication capacity is desired. In optical communication systems using conventional single mode optical fibers, however, a limit to increasing capacity is predicted. As a technique to overcome the limit, active research and development of space division multiplexing have been carried out. Optical fibers to implement space division multiplexing include multicore fibers (MCFs) which have a plurality of cores and where a transmission capacity is increased by transmitting information to each of the cores.

The MCFs are roughly classified into two types of uncoupled MCFs where each core individually transmits information and coupled multicore fibers (C-MCFs) where respective cores are coupled and thereby form supermodes and information is transmitted by each supermode. In order to perform high-quality transmission in uncoupled MCFs, it is important to reduce crosstalk (XT) between each of the cores as well as it is necessary to measure and evaluate the XT.

The following conventional arts 1 to 4 are listed as the conventional techniques of measuring XT.

1. A method of measuring transmission power of light incident on a certain core using a power meter (Non-Patent Document 1)
2. A method using a multi-channel OTDR (Patent Document 1)
3. A method using a bi-directional OTDR (Patent Document 2)
4. A method using a power change amount due to multipath interference of each core for an XT evaluation (Non-Patent Document 2)

Non-Patent Documents 3 to 5 are described below.

PRIOR ART DOCUMENTS

Patent Documents

[Patent Document 1] Japanese Unexamined Patent Application, First Publication No. 2012-202827
[Patent Document 2] Japanese Patent No. 5588050

Non-Patent Documents

[Non-Patent Document 1] K. Imamura et al., "Multicore holey fibers for the long-distance (>100 km) ultra large capacity transmission," OFC/NFOEC2009, OTuC3 (2009)
[Non-Patent Document 2] K. Nakajima et al., "Simple crosstalk characterization technique without multiple core access," ECOC2013, Mo.4.A.5 (2013)
[Non-Patent Document 3] Y. Amma et al., "High-density multicore fiber with heterogeneous core arrangement," OFC/NFOEC2015, Th4C.4 (2015)
[Non-Patent Document 4] F. Oshiyama et al., "Central-obscuration removal plates for focal-plane phase-mask coronagraphs with a centrally-obscured telescope," Publications of the Astronomical Society of the Pacific, 126, pp. 270-279 (2014)
[Non-Patent Document 5] T. Hayashi et al., "Characterization of crosstalk in ultra-low-crosstalk multicore fiber," IEEE/OSA Journal of Lightwave Technology, 30, pp. 583-589 (2012)

Conventional arts 1 and 2 require alignment and connection to a core to be measured. In this case, when measuring the XT of an MCF having a large number of cores (for example, 30-core MCF, see non-patent document 3), alignment and connection to each core to be measured require much effort. Also, by connecting input/output devices such as a Fan-in/Fan-out (Fi/Fo) in advance to both ends of the MCF, the XT can be measured without performing alignment. However, it is always necessary to prepare Fi/Fo devices suitable for the core-to-core distance and the core arrangement of the MCF to be measured.

In conventional art 3, it is possible to measure the XT by connecting dummy fibers to both ends of the same core of the MCF. However, the XT level is usually low (<−25 dB per transmission-distance and the like) in the uncoupled MCF. It is expected that the measurement becomes difficult when the XT is much smaller than the transmission loss of the non-measured fiber.

Even in conventional art 4, similarly to the conventional art 3, a measurement can be performed by connecting dummy fibers to both ends of the same core of fiber. However, a measurement under the conventional art 4 can be only performed on the assumption that inter-mode interference does not occur within a single core. Therefore, it is considered that the conventional art 4 cannot be applied to the XT measurement of a few-mode multicore fiber (FM-MCF) where each core transmits a few modes.

Furthermore, in the conventional arts 3 and 4, an XT between the adjacent cores is measured. Only when the cores are arranged annularly (when the number of combinations between specific adjacent two cores is equal to the number of cores), the simultaneous linear equations are solved to obtain the XT between specific adjacent two cores. However, in the case of other core arrangements (when the number of combinations between specific adjacent two cores is larger than the number of cores), it is not possible for the conventional arts 3 and 4 to obtain the XT between specific two adjacent cores.

SUMMARY

One or more embodiments of the invention provide a method of measuring crosstalk of a multicore fiber and the measurement device of measuring crosstalk of a multicore fiber capable of measuring crosstalk without alignment and connection at an emission end of a multicore fiber.

(1) A method of measuring crosstalk of a multicore fiber in accordance with one or more embodiments include a preparation step of capturing an emitted light pattern at an end portion of a dummy fiber and obtaining a correlation data between a power of the light incident on the dummy fiber and the emitted light pattern, a measurement step of irradiating one core of the multicore fiber with a light through the dummy fiber, and measuring a power of a reference light emitted from the core on which the light is incident, an estimation step of capturing a crosstalk light emitted from a different core different from the core on which the light is incident under a state where the reference light is masked, and estimating a power of the crosstalk light from a captured data of the crosstalk light and the correlation data, and a calculation step of calculating the crosstalk from the power of the reference light and the power of the crosstalk light. Capturing the emission pattern and the crosstalk light is performed by a camera, a screen, or a plurality of light reception elements arranged through a space so as to face an end portion of the multicore fiber without a dummy fiber therebetween.

(2) According to one or more embodiments, the measurement of the power of the reference light may be performed by capturing the reference light with a camera, a screen, or a plurality of light reception elements arranged through a space so as to face an end portion of the multicore fiber and estimating a power of the reference light from a captured data of the reference light and the correlation data.

(3) According to one or more embodiments, the reference light may be masked by disposing a material having a light blocking property on an optical path of an emitted light emitted from the core into which the light is incident.

(4) According to one or more embodiments, the reference light may be masked by disposing a material that reflects a light on an optical path of an emitted light emitted from the core into which the light is incident.

(5) According to one or more embodiments, the reference light may be masked by disposing a material that diffuses a light on an optical path of an emitted light emitted from the core into which the light is incident.

(6) According to one or more embodiments, during estimating the power of the crosstalk light from the captured data of the crosstalk light and the correlation data, image processing may be performed on the captured data of the crosstalk light to remove the reference light overlapping with the crosstalk light.

(7) A crosstalk measurement device of a multicore fiber that performs the method of measuring crosstalk of a multicore fiber according to one or more embodiments includes an obtaining unit that obtain the correlation data between the power of the light incident on the dummy fiber and the emitted light pattern at the end portion of the dummy fiber, a measurement unit that measures a power of the reference light emitted from the core into which the light is incident or an estimation unit that estimates the power from the correlation data, a masking unit that masks the reference light, a capturing unit that captures a crosstalk light emitted from a different core different from the core on which the light is incident, an estimation unit that estimates a power of the crosstalk light from the correlation data, and a calculation unit that calculates a crosstalk from the power of the reference light and the power of the crosstalk light. The capturing unit that captures a crosstalk light includes a camera, a screen, or a plurality of light reception elements arranged through a space so as to face an end portion of the multicore fiber.

According to one or more embodiments of the present invention, it is possible to measure crosstalk without performing alignment and connection at an emission end of a multicore fiber.

EMBODIMENTS FOR CARRYING OUT THE INVENTION

Hereinafter, the present invention will be described based on embodiments with reference to the drawings.

Figure 1:
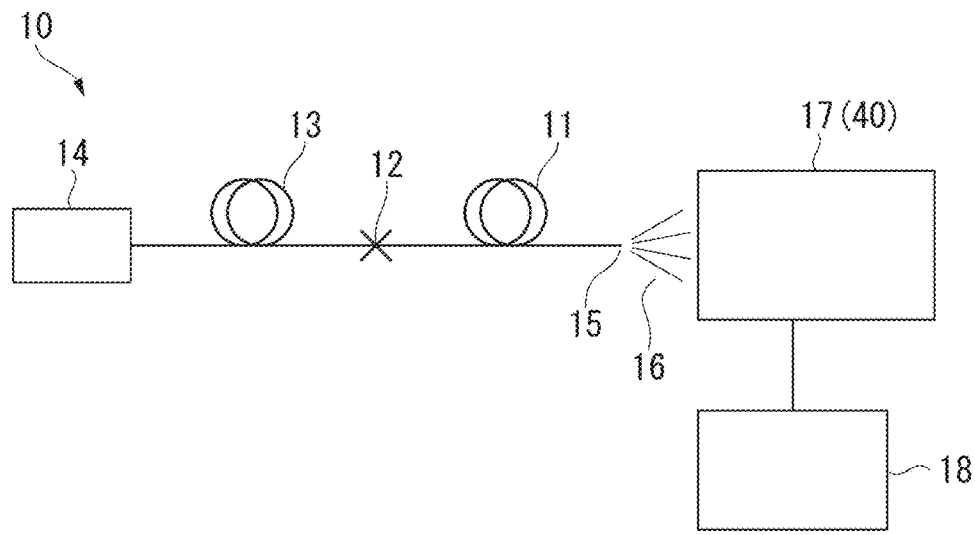
FIG. 1 is a schematic view showing an example of a measurement device according to one or more embodiments of the present invention.

FIG. 1 shows an example of a measurement device according to one or more embodiments of the present invention. As shown in FIG. 1, in the measurement device 10 of one or more embodiments, an incident end 12 of a multicore fiber 11 is connected to a light source 14 via a dummy fiber 13. In addition, a capturing unit 17 including a camera, a screen or a plurality of light reception elements is disposed so as to face an emission end 15 of the multicore fiber 11 and have a space with the emission end 15. This eliminates the need of disposing the dummy fiber between the multicore fiber 11 and the capturing unit 17 in the light reception side, and the task of aligning or connecting the emission end 15 of the multicore fiber 11 to another optical fiber is unnecessary. Moreover, it becomes possible to measure the crosstalk of a plurality of cores at a time.

Figure 2A:
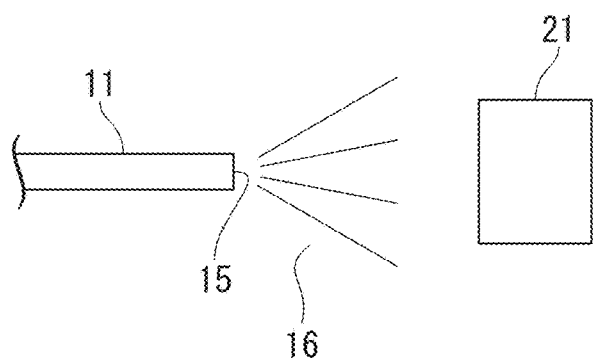
FIG. 2A is a schematic view showing an example of a capturing unit.
Figure 2B:
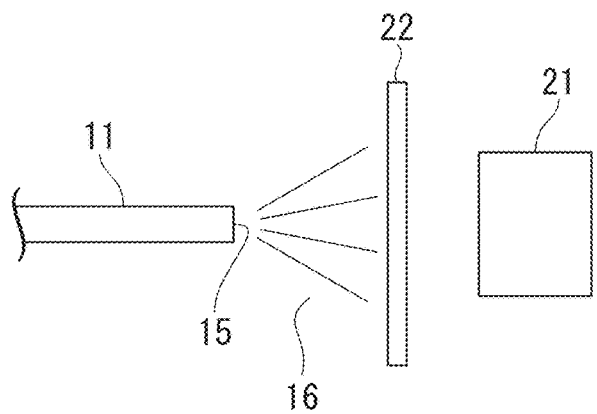
FIG. 2B is a schematic view showing an example of a capturing unit.

Between the emission end 15 of the multicore fiber 11 and the capturing unit 17, the emitted light 16 is propagated as the spatial light. The capturing unit 17, as shown in FIG. 2A, may be a camera 21 focused on the emission end 15. As shown in FIG. 2B, the screen 22 is disposed so as to face the emission end 15 and form a space between the emission end 15 and the screen 22, and a pattern of the emitted light 16 projected on the screen 22 may be captured by the camera 21.

The camera 21 may include a spatial optical system such as a lens. The spatial optical system may be composed of a single lens or may be provided with a compound lens or a lens array (a plurality of lenses). The spatial optical system may have a lens barrel or may not have a lens barrel. When the reflection (stray light) in the lens barrel affects the photographing of the crosstalk light, it is preferable to reduce the reflection or to omit a portion of or the whole of the lens barrel. A lens with antireflection (AR) may be used. The spatial optical system may include components that attenuate light, such as a spatial filter and a polarizer. The component attenuating light may be disposed in the lens barrel or may be arranged outside the lens barrel. An objective lens may be disposed between the spatial filter and the emission end of the multicore fiber. When the lens barrel surrounding the objective lens is omitted between the spatial filter and the emission end, the influence of internal reflection of the barrel can be reduced. Instead of the camera 21, a plurality of light reception elements may be arranged in parallel in the plane. The plane on which the plurality of light reception elements are arranged is preferably a plane perpendicular to a line extending from the emission end 15 of the multicore fiber 11.

Figure 4:
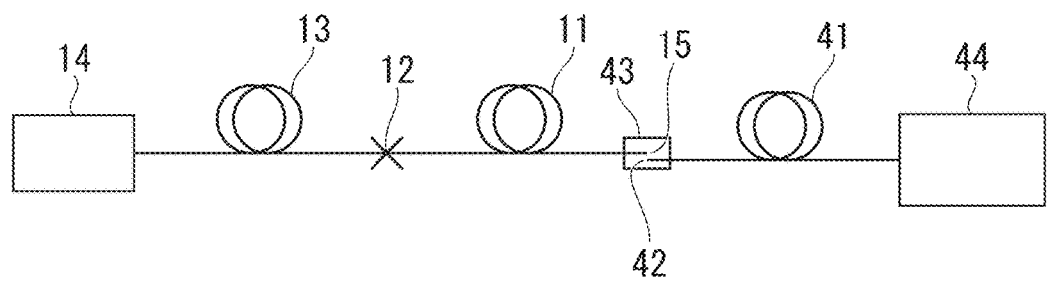
FIG. 4 is a schematic diagram showing a measurement device of Comparative Example.

FIG. 4 shows a measurement apparatus according to the conventional art 1 as Comparative Example. In the measurement device, the alignment and the connection 43 are required between the emission end 15 of the multicore fiber 11 and the incident end 42 of the dummy fiber 41 connected to the power meter 44. Therefore, when the number of the cores of the multicore fiber 11 is large, the work required for measuring the crosstalk of each core is complicated.

According to the measurement apparatus of one or more embodiments, similar to the conventional art 1, since it is not affected by the transmission loss in the multicore fiber 11 and the inter-mode interference in the single core (i.e., the effect of the inter-mode interference is not used for the crosstalk evaluation), measuring the low crosstalk (e.g., −25 dB or less) and the crosstalk measurement between the cores of FM-MCF are also possible. However, unlike the conventional art 1, according to one or more embodiments, the form of the mode field of the crosstalk light can also be confirmed, and some crosstalk can also be measured at the same time. In addition, in one or more embodiments, the crosstalk between the specific cores can be measured similarly to the conventional art 1.

At the connection point of the incident end 12 and the dummy fiber 13 of the multicore fiber 11, since only one core of the multicore fiber 11 needs to be connected to one core of the dummy fiber 13, the operation of connecting fibers to each other by fusion or the like is easy. A method of connecting the multicore fiber 11 and the dummy fiber 13 is not particularly limited, and fusion splicing, connector connection, splice connection, butt joint and the like are exemplified.

Next, a measurement method of one or more embodiments will be described.

(First Step)

The first step is a preparation step of photographing an emitted light pattern at an end of the dummy fiber and obtaining the correlation data between the power of the light incident on the dummy fiber and the captured emitted light pattern.

Figure 3:
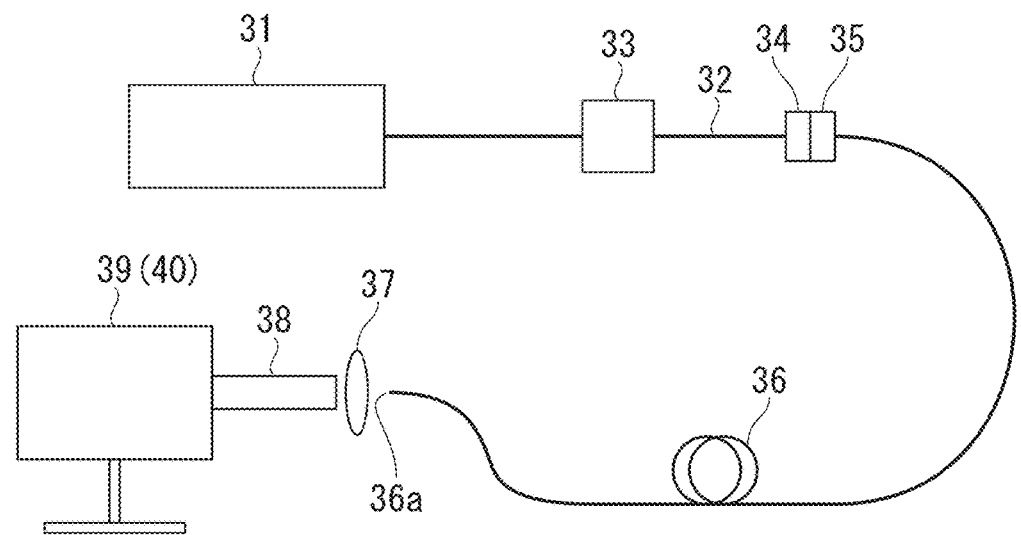
FIG. 3 is a schematic diagram showing an example of an apparatus performing a preparation step.

FIG. 3 shows an example of an apparatus for a preparation step. To the light source 31, an optical fiber 32 having an attenuator 33 and a dummy fiber 36 are connected. As the light source 31, a wavelength-variable light source in an arbitrary wavelength band is preferable. It is desirable that the wavelength of the light source 31 is adjusted to a wavelength at which crosstalk is to be measured. In addition, as the wavelength band, a C band (1530 to 1565 nm), an L band (1565 to 1625 nm), both of the bands, and a portion of the bands can be mentioned.

The optical fiber 32 and the dummy fiber 36 are connected by the connectors 34 and 35. The emission end 36a of the dummy fiber 36 faces the lens barrel 38 of the camera 39 via the lens 37 disposed in the space. The outer peripheral portion of the lens 37 may be supported by a supporting tool (not shown). A predetermined distance is provided between the emission end 36a of the dummy fiber 36 and the lens 37 and between the lens barrel 38 and the lens 37 so that the light propagates through the space. The lens 37 is an objective lens, and the lens barrel 38 includes an imaging lens.

The camera 39 photographs an image (data) for estimating the output power at the emission end 36a of the dummy fiber 36. In particular, an image is captured by focusing the near-field image emitted from the dummy fiber 36 on a surface of the light-receiving element of the camera 39 using an imaging element such as a lens. The lens barrel 38 may be provided with an infinite correction optical system or a finite correction optical system. In addition, without using the lens barrel 38, an imaging element such as a lens may be fixed by a dedicated support tool. The camera 39 may be a near-infrared camera. The exposure time of the camera 39 may be adjusted so that an appropriate image can be taken.

Furthermore, the camera 39 is removed from the apparatus of FIG. 3, and the output power from the dummy fiber 36 is measured using a power measurement device 40 such as a power meter. In order to obtain two or more different output powers, the attenuator 33 can be adjusted to change the power incident on the dummy fiber 36. Instead of using the attenuator 33, it is also possible to change the output power by directly connecting the dummy fiber 36 to the light source 31 to lose the light by bending the dummy fiber 36 or the like. A plurality of dummy fibers 36 having different losses can also be used.

Figure 5:
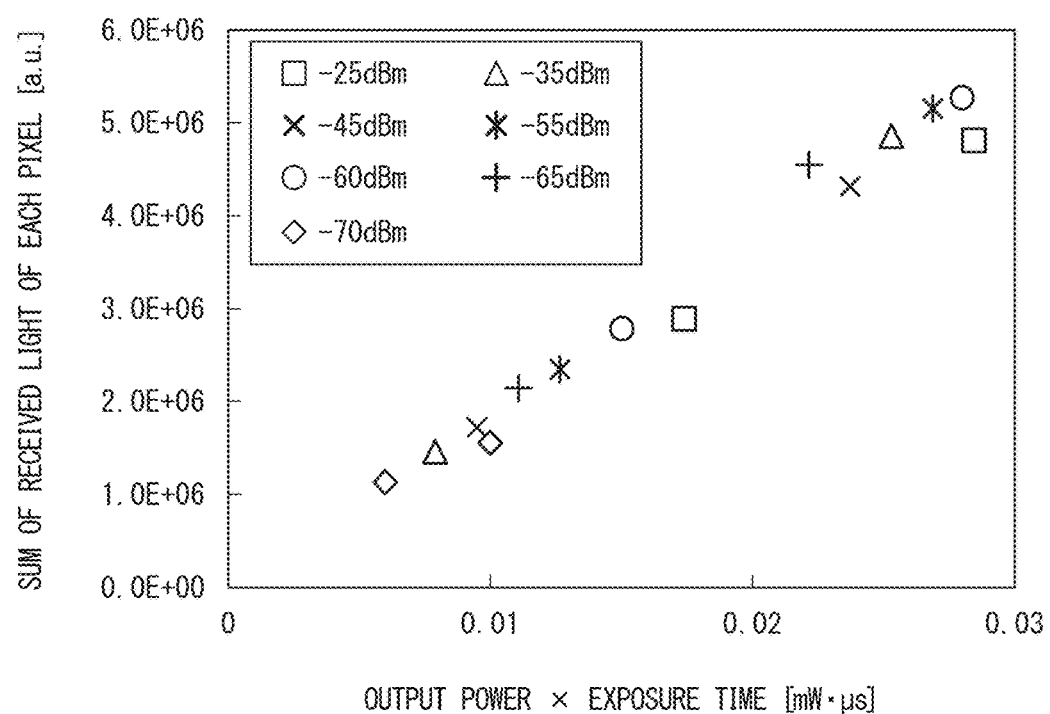
FIG. 5 is a graph showing an example of correlation data in Example 1.

Next, the integrated value (the sum of the received light intensities of each pixel) of the image captured by the camera 39 is obtained, and correlation data between the emitted light power of the dummy fiber 36 and the received light intensity is acquired. FIG. 5 shows an example of a measurement of the correlation data at a wavelength of 1550 nm.

In FIG. 5, the horizontal axis is the product of the output power and the exposure time of the camera, and the vertical axis is the sum of the received light intensities of the respective pixels. As a result, it can be understood that <output power×exposure time> and <sum of received light intensities of each pixel> have a substantially linear relationship. By using the relational expression obtained by linearly approximating this correlation data, it is possible to estimate the output power P from the sum Y of the received light intensities and the exposure time T of the respective pixels.

In particular, assuming that the relational expression is $Y=f(P \cdot T)$, the output power P can be obtained as $P=f^{-1}(Y)/T$. Here, $f^{-1}$ is the inverse function of f.

It is to be noted that since the correlation data acquired in the first step is considered to be effective unless the measurement system (the lens 37, the lens barrel 38, the camera 39, and the like) following the emission end 36a of the dummy fiber 36 is replaced, it is not necessary to perform the process the first step every time. In addition, the dummy fiber 36 may be a different fiber from the dummy fiber 13 in FIG. 1.

The apparatus shown in FIG. 3 is an example in which the lens 37, the lens barrel 38, and a camera 39 are provided as the capturing unit 17. It is preferable that the capturing unit used for measuring the correlation data has the same configuration as the capturing unit used for measuring the crosstalk. In addition, the positional relationship (distance, direction, and the like) between the emission end 36a of the dummy fiber 36 and the camera 39 in FIG. 3 is preferably set to be the same as the positional relationship between the emission end 15 of the multicore fiber 11 and the capturing unit 17 in FIG. 1.

(Second Step)

Next, the measurement device 10 shown in FIG. 1 is structured to measure the power of the reference light emitted from the multicore fiber 11. The light source 14 and the dummy fiber 13 in FIG. 1 may be the same as the light source 31 and the dummy fiber 36 in FIG. 3. In the second step, light enters the specific core (reference core) of the multicore fiber 11 from the light source 14 via the dummy fiber 13, and the power of the light emitted from the core is measured as the power of the reference light.

The measurement of the power of the reference light may be performed by measuring the power of the reference light emitted from the reference core of the multicore fiber 11 using the power measurement device 40 such as a power meter. Here, as in the third step described later, a method is described such that the emitted light of the multicore fiber 11 is captured by the capturing unit 17 and the power of the reference light is estimated from the obtained image data by using the correlation data obtained in the first step.

The reference light is captured by the capturing unit 17 which is arranged to face the emission end 15 of the multicore fiber 11 and to have a space between the emission end 15 and the capturing unit 17. From the image data obtained by the capture, the pixels irradiated with the reference light are extracted, and the sum of the received light intensities of these pixels is calculated. When the obtained sum value is applied to the vertical axis of the correlation data, the product of the output power corresponding to the reference light and the exposure time is estimated. Furthermore, the output power obtained by dividing the exposure time when capturing the reference light is the estimated value of the power of the reference light.

In order to easily adjust the power also in the second step, an attenuator or the like may be inserted between the dummy fiber 13 and the light source 14 as shown in FIG. 3.

During the capturing, a component attenuating light such as an ND filter or a polarizer may be used. This makes it possible to prevent the camera from being damaged when the reference light is too bright. The attenuating component can be arranged between, for example, the emission end 15 of the multicore fiber 11 and the capturing unit 17.

When it is expected that crosstalk of the multicore fiber 11 is sufficiently low (e.g., −25 dB/fiber-length), it is desirable that the power level of capturing the reference light is as large as possible (e.g., more than −15 dBm).

When it is expected that crosstalk of the multicore fiber 11 is sufficiently low (e.g., −25 dB/fiber-length), the power of the reference light may be measured by connecting the emission end 15 of the multicore fiber 11 directly to the power meter or the like.

The measurement of the reference light using the dual core fiber (DCF) shown in FIG. 6 will be described as Example 1. The DCF is a multicore fiber having two cores. The DCF of FIG. 6 has a central core arranged at the center of the fiber and an outer core arranged at a position off center.

(Parameters of DCF)

Relative refractive index difference Δ of center core: 0.47%

Relative refractive index difference Δ of outer core: 0.47%

Core radius of center core: 4.6 μm

Core radius of outer core: 4.1 μm

Cable cutoff wavelength of center core: 1.46 μm

Cable cutoff wavelength of outer core: 1.33 μm

Core-to-core distance: 30.3 μm

Clad diameter: 163.1 μm

Fiber length: 1.3 km

Bending radius: 105 mm

The reference light was captured using an ND filter with an optical density (OD) of 3.0 (attenuation amount of 30 dB), and a power was estimated from the correlation data (linear approximation) in FIG. 5, and the received light power was estimated to be −43.8 dBm. Therefore, the emission power of the reference light is estimated to be −13.8 dBm.

(Third Step)

In the third step, light is made incident on one core of the multicore fiber 11 via the dummy fiber 13 in a state where the reference light is masked, and crosstalk light which is emitted from a core different from the core to which the light is incident is captured and the power of the crosstalk light is estimated. When the light is incident on a specific core (incident core) of the multicore fiber 11 to excite the incident core, light emitted from the incident core is the reference light, and light emitted from other cores is the crosstalk light. In the present Example, since the DCF is used, the number of cores from which the crosstalk light is emitted is one. When the number of cores of the MCF is large, it is also possible to simultaneously capture the crosstalk light emitted from two or more cores.

The order of the second step and the third step is arbitrary. It is also possible to capture the reference light and the crosstalk light at the same time while attenuating the reference light by an ND filter or the like having a predetermined attenuation amount to simultaneously perform the second step and the third step.

The measurement of the crosstalk light can be performed with the same configuration as that of the measurement device 10 shown in FIG. 1 described above (second step). However, when the crosstalk is very small with respect to the reference light (for example, −25 dB/fiber-length or less), since the dynamic range of the pixel of the camera is small at the time of capturing, the crosstalk light is buried in the reference light or the reference light is too bright and the camera may be damaged. Therefore, when the crosstalk is very small with respect to the reference light, a filter or the like masking only the reference light is used in order to capture the crosstalk light.

One example is to cover a portion of the camera filter with a light-shielding tape (attenuation is approximately 50 dB) and to arrange the tape just before the light reception element of the camera. At this time, it is desirable that the attenuation amount of the light shielding tape is as large as possible (for example, attenuation amount ≥40 dB). It is desirable to reduce the reflection of the light-shielding tape and the inside of the lens barrel (for example, reflection attenuation ≥20 dB). It is preferable that the material of the light shielding tape has a property of blocking or attenuating light to the extent that the light is not detected by the light reception element.

The masking unit is not limited to a light-shielding material; however, a component (prism or the like) that reflects only the reference light, an optical component (lens or the like) that diffuses only the reference light, or a component that has a mechanism attenuating only the reference light (combination of ND filter, polarizer, wave plate, and the like) may be used. It is preferable that the light reflected by a component such as a prism is attenuated by the absorber or emitted outside the lens barrel.

Another masking unit includes components such as a filter having a singular point of phase at the center (see Non-Patent Document 4). It is possible to attenuate only the reference light by disposing the component such that the reference light passes through the singular point portion of the phase. It is also possible to use two or more masking units in combination.

As another masking unit, there is also a configuration in which the reference light is imaged outside the light reception element of the camera so that the reference light is not captured.

The above-mentioned masking unit such as a filter or the like may be disposed in an arbitrary space on the optical path (for example, between the emission end 15 of the multicore fiber 11 and the objective lens, between the objective lens and the imaging lens, and between the imaging lens and the light reception element or the like).

Capturing the crosstalk light and estimating the power of the crosstalk light can be performed in the same manner as in the second step. At this time, it is desirable that the power of the reference light is substantially the same as the power captured or measured in the second step (for example, within ±1 dB). Also, it is desirable that most of the reference light is not imaged on the light reception element by masking.

Figure 6:
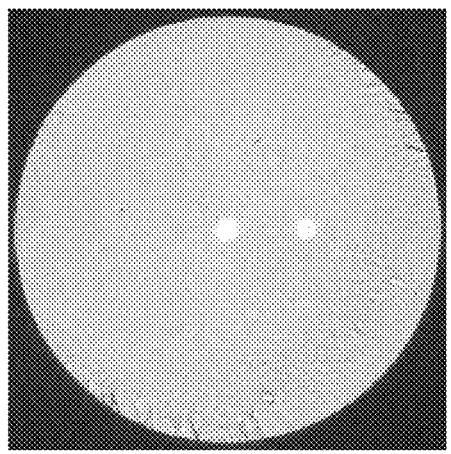
FIG. 6 is a drawing-substitute photograph showing an end face of the MCF used in Example 1.
Figure 7:
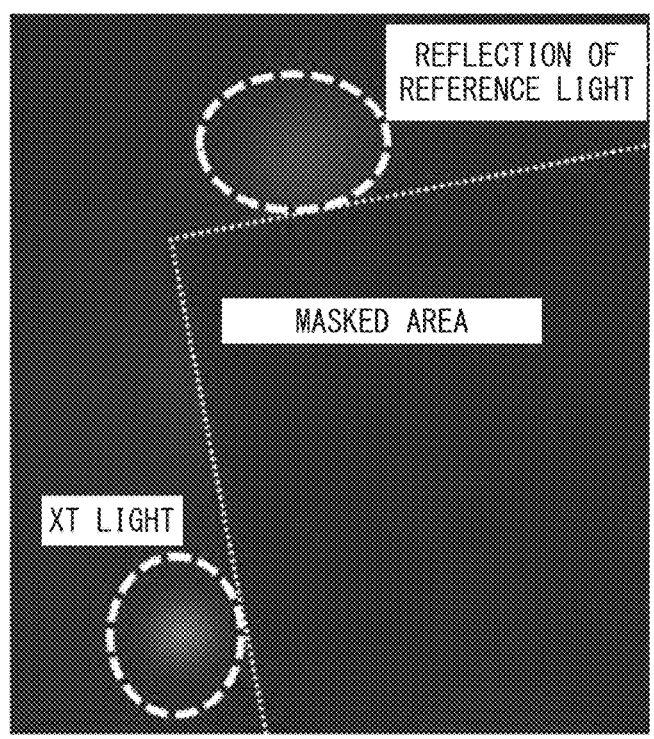
FIG. 7 is a drawing-substitute photograph showing an example of a masking step.

FIG. 7 shows an example (Example 1) of an image obtained by capturing the crosstalk light using the DCF of FIG. 6. The central core of the DCF was excited and the crosstalk from the central core to the outer core was measured. The image in FIG. 7 was obtained by capturing a moving image while performing wavelength sweep (see Non-Patent Document 5), and then time-averaging each pixel. From this image, the emission power of the crosstalk light was estimated to be −43.2 dBm. In addition, in FIG. 7, reflection of the reference light inside the lens barrel together with the crosstalk light (XT light) can be confirmed. As in the present Example, if the reflected light and the crosstalk light do not overlap, it is possible to measure the crosstalk light. A mechanism may be provided to reduce the reflected light or the imaging of the reflected light as much as possible. As a mechanism for reducing the reflected light, a material that absorbs light attached inside the lens barrel, a diaphragm, and the like can be mentioned.

(Fourth Step)

In the present step, the crosstalk is determined from the power of the reference light and the power of the crosstalk light. When the power value is displayed in decibels, the difference in the values is the power ratio.

In the case of Example 1, the power of the reference light measured in the second step is −13.8 dBm, and the power of the crosstalk light measured in the third step is −43.2 dBm. Therefore, the crosstalk value can be obtained as −29.4 dB/fiber-length by subtracting the power of the reference light from the power of the crosstalk light.

The value of the crosstalk of DCF measured by the method of conventional art 1 is −30.8 dB/fiber-length, which is in good agreement with the result of the present Example.

While the present invention has been described on the basis of the one or more embodiments above, the present invention is not limited to the above-mentioned embodiments but various modifications may be made without departing from the scope of the present invention.

In Example 1, the near-field pattern of the emitted light is focused on the camera and captured. Instead, a near-field image may be formed on the screen. The capturing procedure is almost the same as when the near-field pattern image is imaged on the camera. At this time, a laser of visible light may be used as the light source. Also, images taken on the screen may be captured with a camera. The screen itself may be configured by a plurality of rows of light reception elements. A plurality of rows of the light reception elements may be arranged on the back side of the screen having transparency. When the light incident on the multicore fiber is visible light, it is also possible to measure the light receiving pattern with the light reception element while confirming the image of the screen.

The measurement device 10 of one or more embodiments may include a controller 18 such as a computer in addition to the masking unit of the reference light and the capturing unit 17 as described above.

The controller 18 acquires correlation data between the power of the light incident on the dummy fiber 13 and the emitted light pattern, estimates the power of the crosstalk light from the correlation data, and calculates the power of the reference light and the power of the crosstalk light crosstalk may be obtained from the ratio.

For example, the controller 18 is configured to acquire the correlation data and to further receive the image data of the crosstalk light captured by the capturing unit 17. Thereby, the controller 18 can estimate the power of the crosstalk light based on the relationship between the correlation data and the image data of the crosstalk light.

The controller 18 receives the image data of the reference light captured by the capturing unit 17, and the controller 18 can estimate the power of the reference light based on the relationship between the correlation data and the image data of the reference light. In order to measure the power of the reference light, the measurement device 10 may further include a power measurement device such as a power meter described above. The measurement device 10 may be provided with a unit exchanging the photographing unit, a masking unit, a power measurement device and the like in a position facing the emission end 15 of the multicore fiber 11 according to each step.

In the third step, the controller 18 may perform image processing to remove the overlap of the reference light from the captured data of the crosstalk light. When the crosstalk light is captured under the masking is applied, the skirt of the reference light may leak around the masking and overlap with the crosstalk light. It is possible to estimate the intensity of the reference light at the position of an emission core of the crosstalk light and to use the result of subtracting the intensity of the reference light estimated from the intensity in the imaging data as more correct data of the crosstalk light. By performing such image processing, it is possible to estimate the power of crosstalk light more accurately. A method of estimating the intensity of the reference light at the position of the exit core of the crosstalk light may include, on the MCF end face and with a center position of the masking as a reference, extracting each intensity at a plurality of positions where no core exists and an each distance of which is equal to the distance from the center position of the masking to the position of the emission core, and obtaining a representative value such as an average value, a median value or the like of these intensities. The shape of the masking is not particularly limited, such as a rectangle (a square or a rectangle), a polygon, and a circle. In estimating the intensity of the reference light, it is also possible to obtain the distribution of the skirt of the reference light around masking considering the shape of the masking.

The camera, the screen, or the plurality of light reception elements are preferably configured so as to spread two-dimensionally in a plane perpendicular to an extension line of the emission end 15 of the multicore fiber 11 to eliminate the alignment, and be able to perform capturing at any position within a certain region.

In order to adjust a position of the end portion of the optical fiber with respect to the capturing unit, a positioning unit such as a stage may be used. A stage capable of adjusting at least an XY biaxial is preferable.

Next, regarding the measuring method of the above-described embodiments, Example 2 in which a seven-core fiber (7CF) is applied and Example 3 in which a 32-core fiber (32CF) is applied are described.

Example 2

Figure 8:
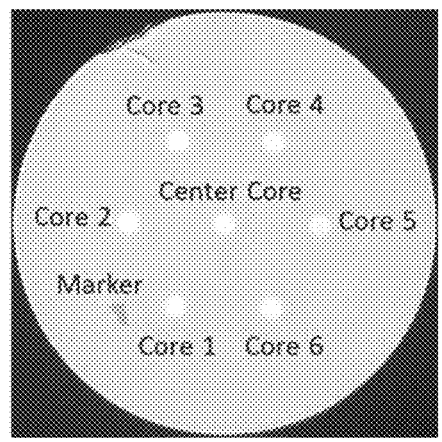
FIG. 8 is a drawing-substitute photograph showing an end face of the MCF used in Example 2.

The parameters of 7CF were such as a fiber length of 5.8 km, a cladding diameter of 179.8 µm, an average core-to-core distance of 40.5 µm, and a cable cutoff wavelength ≤1.22 µm. FIG. 8 shows a photograph of an end face of 7CF used as the MCF in the present example. A marker may be provided on the MCF end face. The measurement wavelength was 1550 nm.

Figure 9:
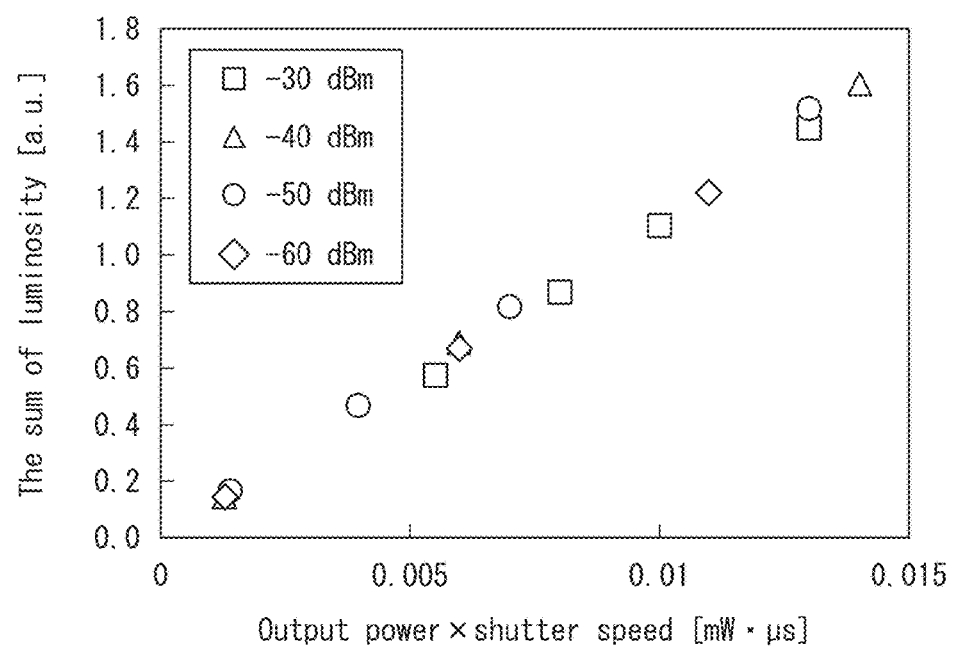
FIG. 9 is a graph showing correlation data in Example 2.

As in Example 1, the emission pattern at the end of the dummy fiber was captured in the first step, and the correlation data between the power of the light incident on the dummy fiber and the emitted light pattern was acquired. FIG. 9 shows an example of the correlation data measurement. The horizontal axis in FIG. 9 is the product of the emission power from 7CF and the shutter speed of the camera, and the vertical axis is the total value of the luminance values of each pixel. As a result, it can be understood that <emission power×shutter speed> and <total value of luminance values of respective pixels> are in a substantially linear relationship. By using the relational expression obtained by linearly approximating the correlation data, it is possible to estimate the emission power from the captured image as in Example 1.

Figure 10:
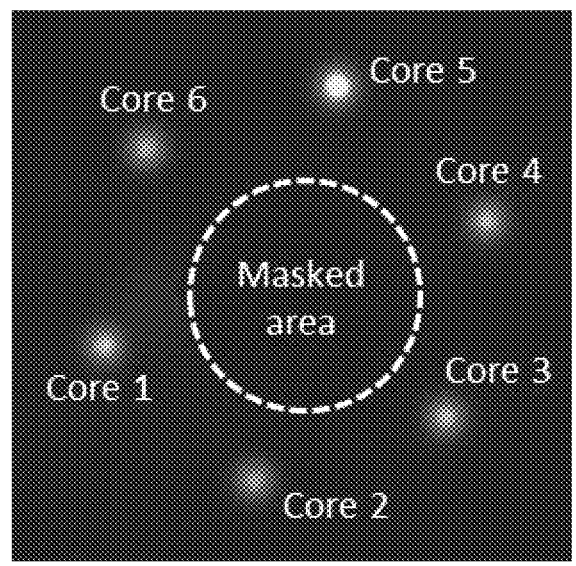
FIG. 10 is a drawing-substitute photograph showing a captured image of crosstalk light in Example 2.

By exciting the central core of 7CF and capturing the crosstalk light in the same procedure as in the third step of Example 1, an image as shown in FIG. 10 was obtained. The light (reference light) from the central core is masked, and the crosstalk light emitted from the surrounding six cores is captured. Before or after capturing the crosstalk light, a dummy fiber is connected (fused or butt-jointed) to the central core and two arbitrary outer cores, and by checking which position glows when light is entered, the core number is identified.

Using the captured image of the crosstalk light exemplified in FIG. 10, the captured image of the reference light (not shown) using the ND filter, and the correlation data shown in FIG. 8, the crosstalk value was obtained by the same procedure as the fourth step of Example 1. Table 1 shows measured values of the crosstalk by a camera (that is, the present Example) and measured values of the crosstalk by a conventional power meter method (Reference Example). Note that the crosstalk measurement by the camera was performed in the same manner as in the second to fourth steps of Example 1 except that a method of performing image processing in the third step and removing the influence of the skirt of the reference light was used. The measurement described above was repeated three times. From Table 1, it is understood that the measured values of the present Example correspond well with the measured values of the Reference Example.

TABLE 1

| Combination of Cores | Measured Values of Crosstalk by Camera | | | Measured Values of Crosstalk by Conventional Power Meter Method |
|---|---|---|---|---|
| | First Time | Second Time | Third Time | |
| Center-Core 1 | −25.1 | −25.0 | −25.2 | −25.3 |
| Center-Core 2 | −25.3 | −25.6 | −25.6 | −26.2 |
| Center-Core 3 | −25.1 | −25.2 | −25.6 | −25.1 |
| Center-Core 4 | −25.8 | −25.6 | −25.6 | −26.6 |
| Center-Core 5 | −24.9 | −24.2 | −24.1 | −25.5 |
| Center-Core 6 | −25.4 | −25.6 | −25.7 | −26.4 |

Example 3

Figure 11:
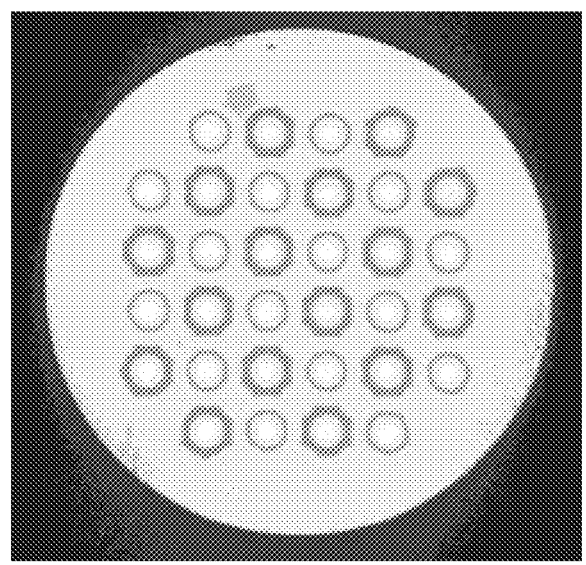
FIG. 11 is a drawing-substitute photograph showing an end face of the MCF used in Example 3.
Figure 12:
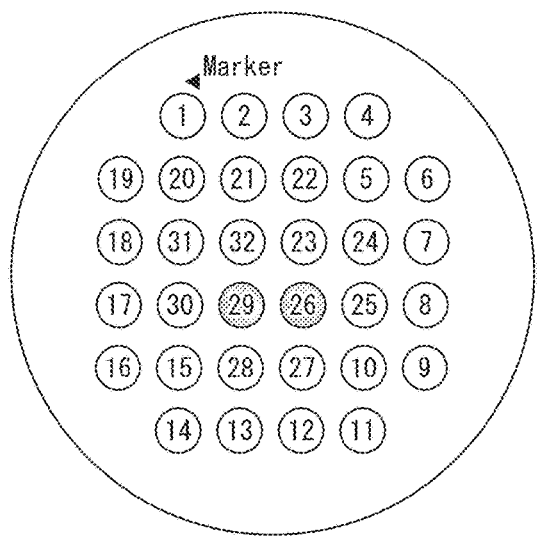
FIG. 12 is a diagram showing a core number of the MCF used in Example 3.

The parameters of 32CF include a fiber length of 5.8 km, a cladding diameter of 244.2 µm, a closest average inter-core distance of 29.0 µm, a second proximity (diagonal) inter-core distance of 40.9 µm, and a cutoff wavelength after 1 km propagation ≤1.53 µm. FIG. 11 shows a photograph of the end face of 32CF used as an MCF in the present Example. A marker may be provided on the MCF end face. The core number of 32CF is shown in FIG. 12.

For the 32CF (MCF), the crosstalk is measured by using an improved measurement system. In the improved measurement system, so as to face the emission end of the MCF, an objective lens, a spatial filter, a condenser lens, an ND filter (if necessary), and a camera are arranged in this order. Further, without providing a lens barrel between the emission end of the MCF and the spatial filter, the lens barrel is arranged between the spatial filter and the camera. As in Example 1, in the first step, the emitted light pattern at the end of the dummy fiber is captured, and the correlation data between the emitted light pattern that is captured and the power of light incident on the dummy fiber (not shown).

Figure 13:
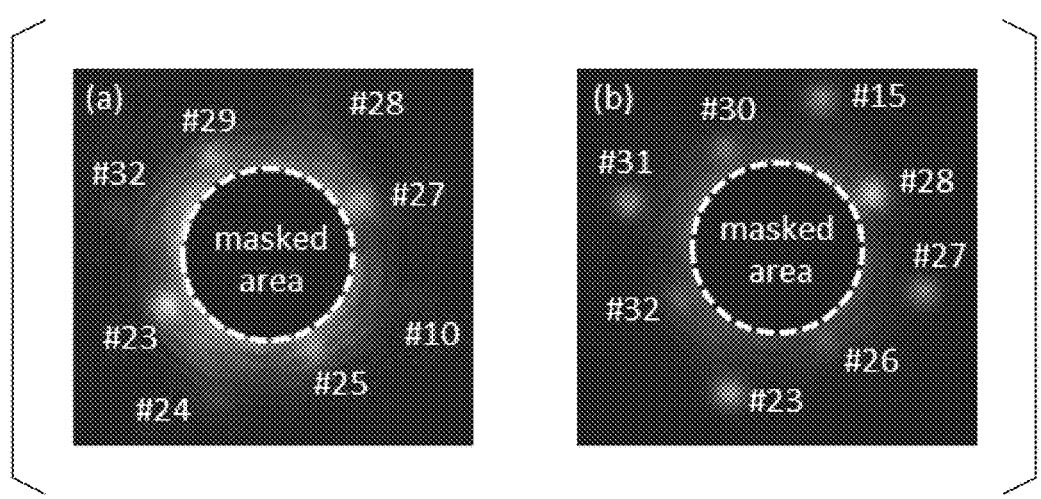
FIG. 13 is a drawing-substitute photograph showing a captured image of crosstalk light in Example 3.

The 26th core (#26) or the 29th core (#29) of the 32CF was excited and the crosstalk light was captured in the same procedure as in the third step of Example 1, an image as shown in FIG. 13 was obtained. Part (a) of FIG. 13 shows the image when the 26th core was excited and part (b) of FIG. 13 shows the image when the 29th core was excited.

Although light that appears to be caused by unnecessary reflection is not found in both images, in part (a) of FIG. 13, an overlap of the skirt of the reference light and the crosstalk light can be found around the masking.

The crosstalk light from the 26th core to the closest core (odd number: #23, #25, #27, and #29) can be found; however, the crosstalk light from the 26th core to the second proximity core (even number: #10, #24, #28, #32) cannot be found. This is because the crosstalk to the second proximity core is smaller (at least approximately 10 dB or more) than the crosstalk to the nearest core. This is also confirmed from the measurement results by the conventional power meter method. In part (b) of FIG. 13, the skirt of the reference light can be confirmed around the masking although it is smaller than the skirt shown in part (a) of FIG. 13. However, the crosstalk light from the 29th core to all of the eight peripheral cores (the nearest core and the second proximity cores) can be found.

Figure 14:
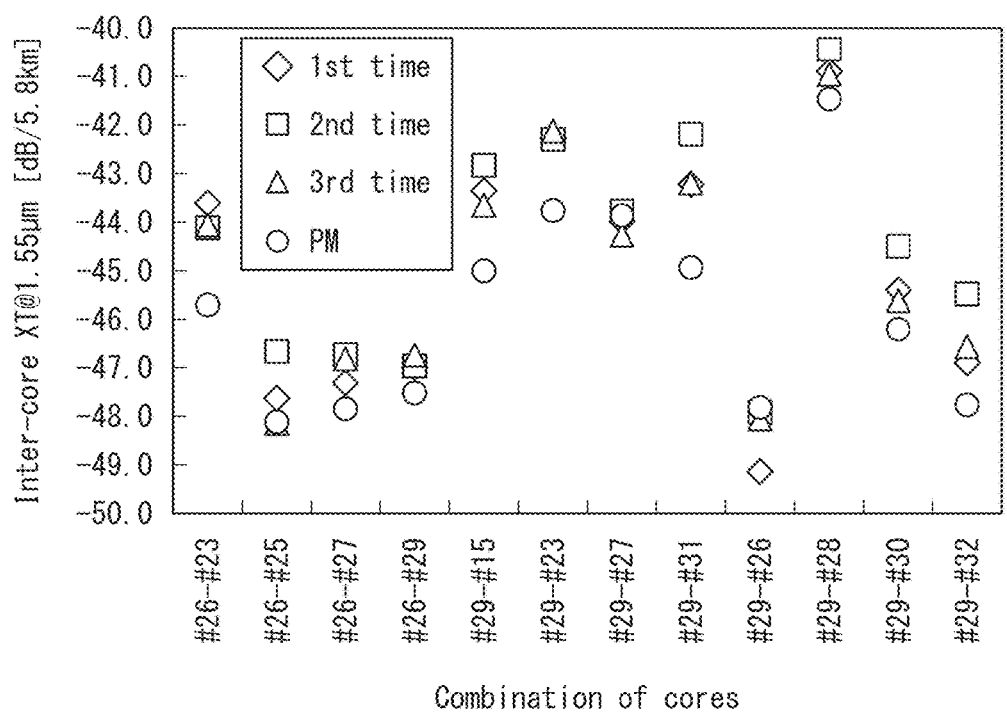
FIG. 14 is a graph showing a crosstalk measurement results in Example 3.

FIG. 14 shows crosstalk (XT) measurement results between the cores at a wavelength of 1550 nm.

Here, "1st time", "2nd time" and "3rd time" indicate crosstalk measurement values using the camera (i.e., the present Example). In addition, "PM" indicates crosstalk measurement values by the conventional power meter method (Reference Example). The crosstalk measurement by the camera was performed in the same manner as the second step to the fourth step of Example 1, except for using a method of removing the effect of the skirt of the reference light by performing image processing in the third step, in the same manner as Example 2. The above measurement was repeated three times. From FIG. 14, it is understood that the crosstalk value close to −50 dB/fiber-length can be measured in the present Example, and the measured values of the present Example and the Reference Example are matched well. In the present Example, it was confirmed that crosstalk to the nearest neighbor core was measured as high as several dB when image processing was not performed.

INDUSTRIAL APPLICABILITY

According to the above-described embodiments of the present invention, it is possible to provide a method of measuring crosstalk of a multicore fiber and an apparatus of the same which is capable of measuring crosstalk without alignment and connection at an emission end of a multicore fiber.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE SYMBOLS

10: measurement device
11: multicore fiber
12: incident end
13, 36: dummy fiber
14, 31: light source
15: emission end
16: emitted light
17: capturing unit
21, 39: camera
22: screen

The invention claimed is:

1. A method of measuring crosstalk of a multicore fiber, the method comprising:
   capturing an emitted light pattern at an end portion of a dummy fiber and obtaining correlation data between power of a light incident on the dummy fiber and the emitted light pattern;
   irradiating one core of the multicore fiber with a light through the dummy fiber, and measuring power of a reference light emitted from the core into which the light is incident;
   capturing a crosstalk light emitted from a different core different from the core into which the light is incident under a state where the reference light is masked, and estimating power of the crosstalk light from captured data of the crosstalk light and the correlation data; and
   calculating the crosstalk from the power of the reference light and the power of the crosstalk light,
   wherein the capturing of the emitted light pattern and the capturing of the crosstalk light are performed by a camera, a screen, or a plurality of light reception elements arranged through a space so as to face an end portion of the multicore fiber without the dummy fiber therebetween.

2. The method of measuring crosstalk according to claim 1, wherein the measuring of the power of the reference light is performed by capturing the reference light with the camera, the screen, or the plurality of light reception elements arranged through the space so as to face the end portion of the multicore fiber and estimating power of the reference light from captured data of the reference light and the correlation data.

3. The method of measuring crosstalk according to claim 1, wherein the reference light is masked by disposing a material having a light blocking property on an optical path of an emitted light emitted from the core into which the light is incident.

4. The method of measuring crosstalk according to claim 1, wherein the reference light is masked by disposing a material that reflects a light on an optical path of an emitted light emitted from the core into which the light is incident.

5. The method of measuring crosstalk according to claim 1, wherein the reference light is masked by disposing a material that diffuses a light on an optical path of an emitted light emitted from the core into which the light is incident.

6. The method of measuring crosstalk according to claim 1, wherein during the estimating of the power of the crosstalk light from the captured data of the crosstalk light and the correlation data, image processing is performed on the captured data of the crosstalk light to remove the reference light overlapping with the crosstalk light.

7. A crosstalk measurement device of a multicore fiber with a core that is irradiated with a light through a dummy fiber, the crosstalk measurement device comprising:
   an obtainer that obtains correlation data between power of a light incident on the dummy fiber and an emitted light pattern at an end portion of the dummy fiber;
   a measurer that measures power of a reference light emitted from the core irradiated with the light;
   a masking unit that masks the reference light; and
   a capturing unit that captures a crosstalk light emitted from a core of the multicore optical fiber that is different from the core irradiated with the light,
   wherein an estimator estimates power of the crosstalk light using the correlation data,
   wherein a calculator calculates a crosstalk using the power of the reference light and the power of the crosstalk light,
   wherein the capturing unit comprises the camera, a screen, or a plurality of light reception elements arranged through a space to face an end portion of the multicore fiber.

* * * * *